US006115923A

United States Patent [19]

Gentry et al.

[11] Patent Number: 6,115,923

[45] Date of Patent: Sep. 12, 2000

[54] TEETHING SPOON

[76] Inventors: Belinda J. Gentry, 800 Falcon Dr.; Geraldine A. Sisk, 2005 Stacy, both of Harrisonville, Mo. 64701

[21] Appl. No.: 09/204,312

[22] Filed: Dec. 3, 1998

[51] Int. Cl.[7] .................................................. A47J 43/28

[52] U.S. Cl. ................................ 30/324; 30/142; 30/322

[58] Field of Search ............................ 32/142, 147–150, 32/322–328, 125, 340

[56] References Cited

U.S. PATENT DOCUMENTS

| | | | |
|---|---|---|---|
| D. 204,788 | 5/1966 | De Mieri | 30/324 X |
| 3,795,062 | 3/1974 | Lamb | 30/324 X |
| 5,264,267 | 11/1993 | Wang | 30/324 X |
| 5,669,143 | 9/1997 | Wu | 30/324 |
| 5,946,807 | 9/1999 | Crane et al. | 30/324 X |

*Primary Examiner*—Douglas D. Watts
*Attorney, Agent, or Firm*—Patrick J. Walsh

[57] ABSTRACT

A double-ended teething spoon with a water filled transparent handle formed of a firm, resilient material to provide gum relief for teething infants, as well as hand-eye coordination, training in use of the spoon, and amusement by viewing objects suspended in the handle.

1 Claim, 1 Drawing Sheet

TEETHING SPOON

BACKGROUND OF THE INVENTION

The present invention relates to child development and particularly to a teething spoon for infants aged 5 months to 2 years and older. Infants benefit from gum relief when teething and the present invention is directed to a teething spoon to provide gum relief, to provide an aid for hand-eye coordination, to provide practice in use of a spoon, and amusement through visualization of colorful objects in the spoon.

SUMMARY OF THE INVENTION

In a preferred embodiment of the invention, a teething spoon comprises an elongate handle with integral spoons at both ends of the handle. The teething spoon is fabricated of non-toxic, resilient material which yields when bitten by a teething infant. Each of the spoon ends have concave shape with the size of a teaspoon, or smaller than a teasponn as desired. Preferably, the handle is hollow and filled with sanitized water to provide resilient firmness to the handle. In addition, the handle may also be transparent for display of colorful objects such as shining sparkles floating in the sanitized water.

OBJECTS OF THE INVENTION

An object of the invention is to provide a new and improved teething spoon.

Another object of the invention is to provide a new and improved double-ended teething spoon fabricated of a rubberized, resilient material.

Another object of the invention is to provide a new and improved double-ended teething spoon with a connecting handle filled with water for resilient firmness, and with the handle transparent for display of objects suspended in the water.

Another object of the invention is to provide a new and improved double-ended teething spoon with a water filled transparent connecting handle to provide gum relief for teething infants, as well as hand-eye coordination, training in use of the spoon, and amusement by viewing objects suspended in the handle.

Other and further objects of the invention will become apparent with an understanding of the following detailed description of the invention or upon employment of the invention in practice.

A preferred embodiment of the invention has been chosen for purposes of detailed description and is shown in the accompanying drawing in which.

DETAILED DESCRIPTION OF THE PREFERRED EMBODIMENT

Figure 1:
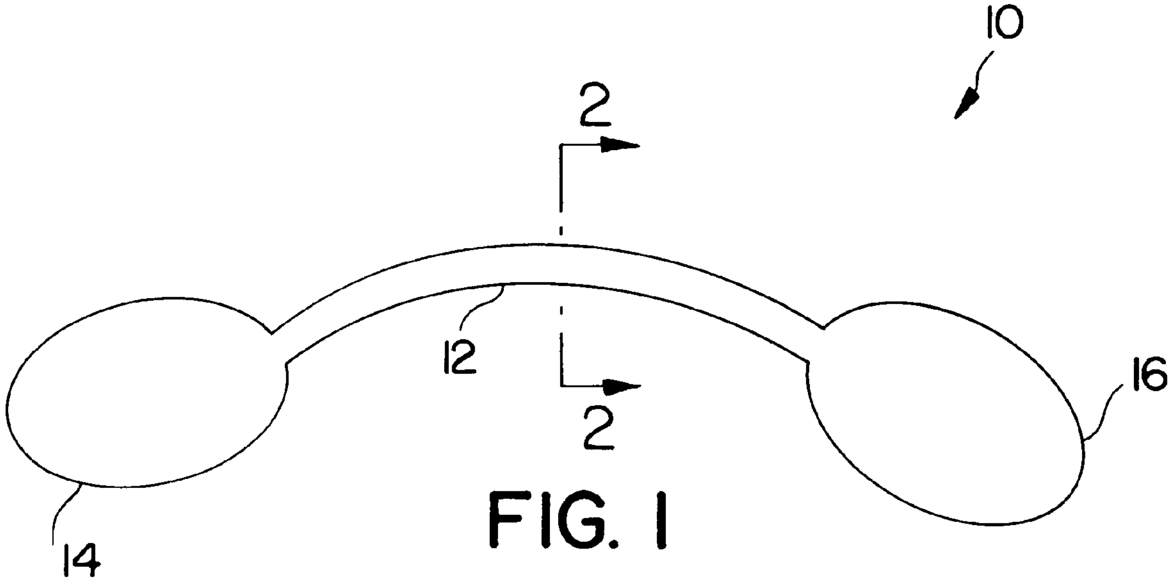
FIG. 1 is a plan view of a teething spoon according to the invention.
Figure 2:
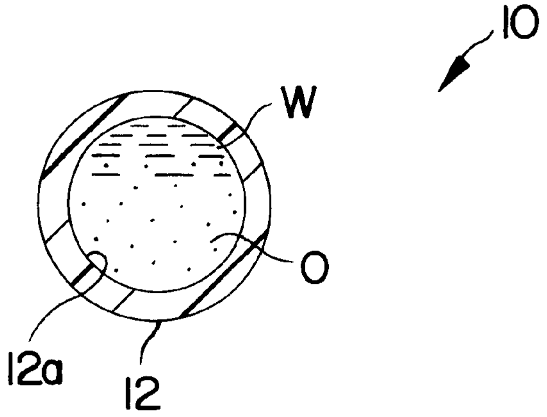
FIG. 2 is an enlarged section view taken along line 2—2 of FIG. 1 to show to contour of the spoon handle and its internal contents.

Referring to the drawing, a preferred embodiment of the invention comprises a teething spoon 10 with an arcuate central handle 12 joining spoon ends 14, 16.

The handle is curved and elongate for fitting in an infant's clenched fist so as to position the spoon ends outside the fist with adequate clearance permitting the infant to mouth a spoon end. The curvature generally conforms to an infant's hand and facilitates directing the spoon end toward the mouth.

In a preferred form of the invention, the handle is hollow defining an enclosed chamber 12*a* to receive sanitized water W for resilient firmness of the handle. The handle may also be transparent for display of floating or suspended objects O such as shining sparkles within the water to provide amusement for an infant. Articles having a specific gravity approximately that of water remain suspended in the body of water.

Each spoon end 14, 16 is concave and approximately the size of or smaller than a tea spoon.

The teething spoon is fabricated of non-toxic rubber or rubber-like material characterized by firmness for handling by an infant and by yielding when mouthed and bitten by an infant seeking gum relief.

Various changes may be made to the structure embodying the principles of the invention. The foregoing embodiments are set forth in an illustrative and not in a limiting sense. The scope of the invention is defined by the claims appended hereto.

We claim:

1. A teething spoon comprising an elongate, arcuate hollow transparent handle with opposite ends formed of a firm, resilient material selected from the group consisting of non-toxic rubber or rubber-like material characterized by firmness for handling by an infant and by yielding when bitten by an infant, a spoon fitted to each opposite end of the handle, the hollow handle defining an enclosed chamber, a body of water in the enclosed chamber, and objects suspended in the water for providing gum relief for teething infants, hand-eye coordination, training in use of the spoon, and amusement by viewing objects suspended in the handle.

* * * * *